United States Patent Office 2,715,930
Patented Aug. 23, 1955

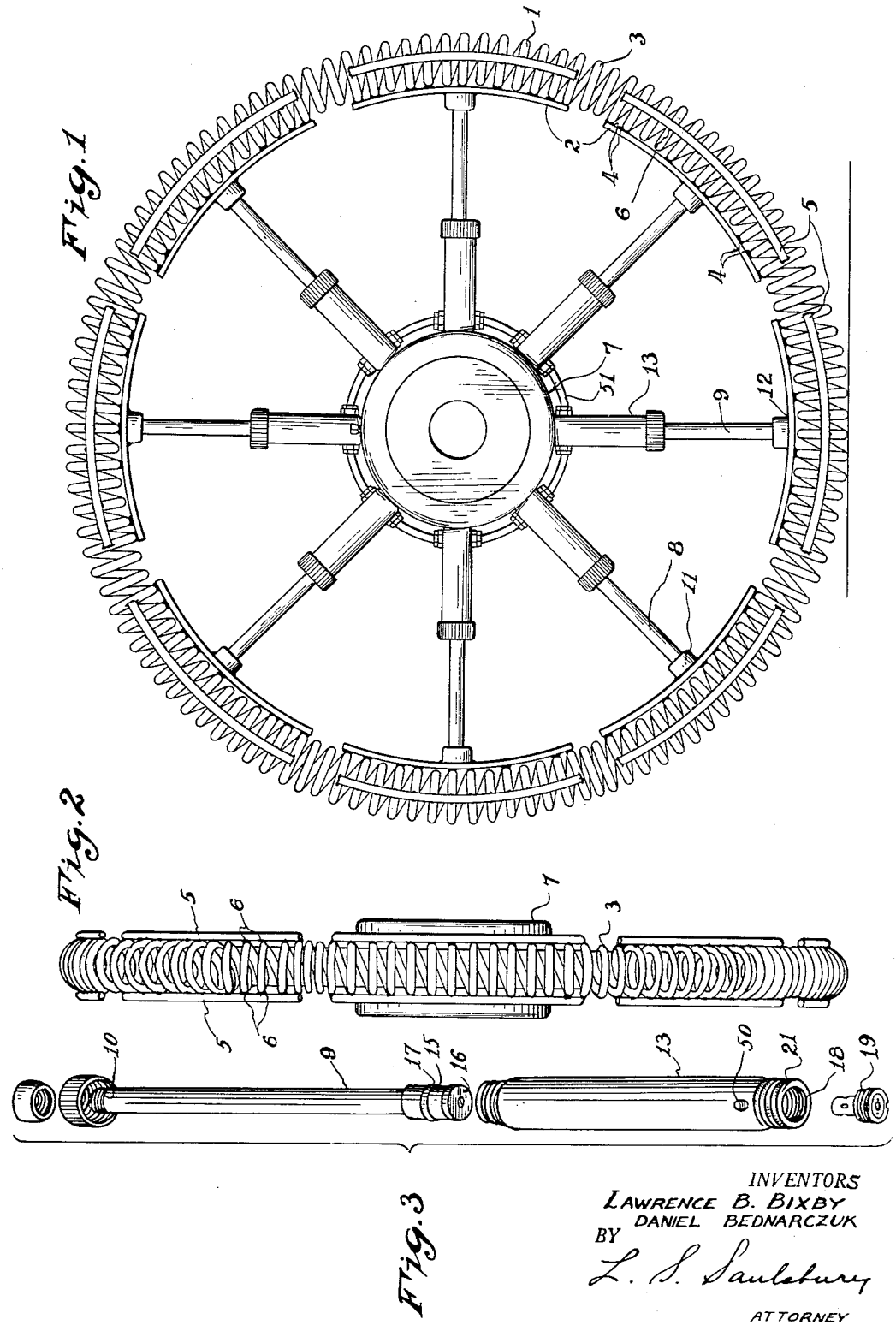

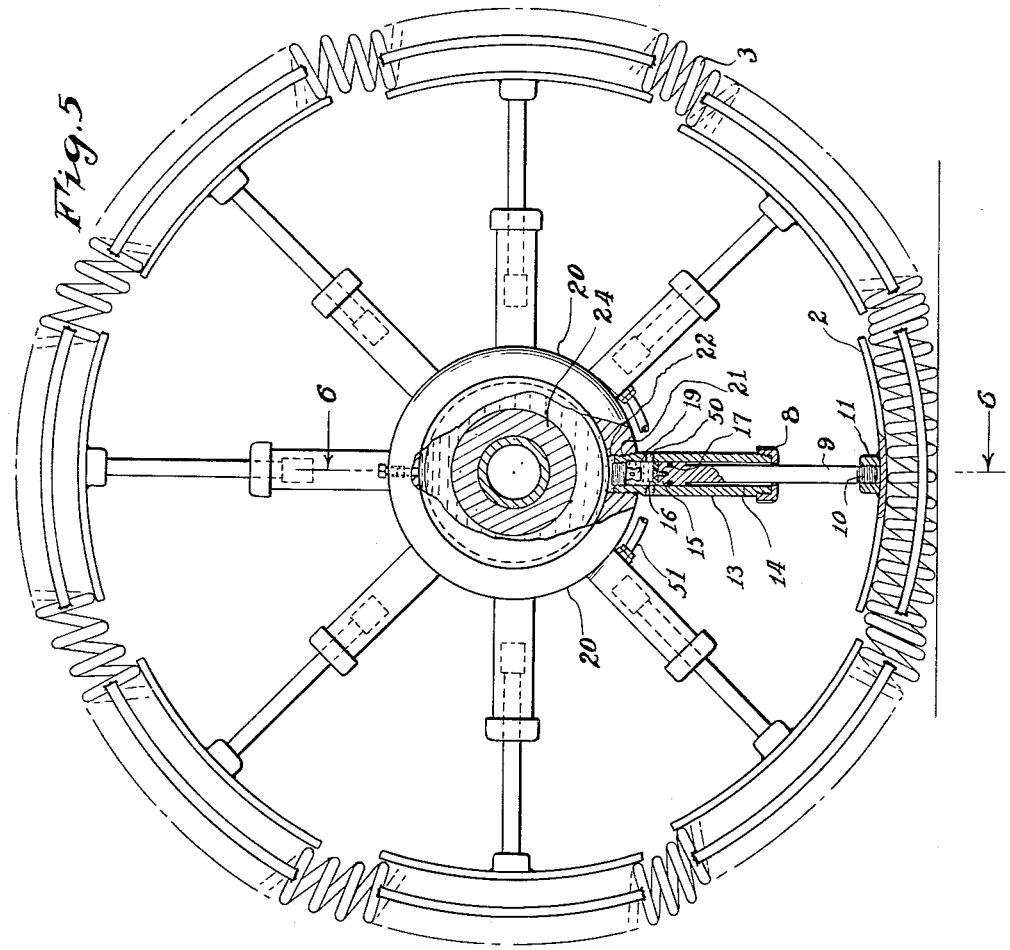
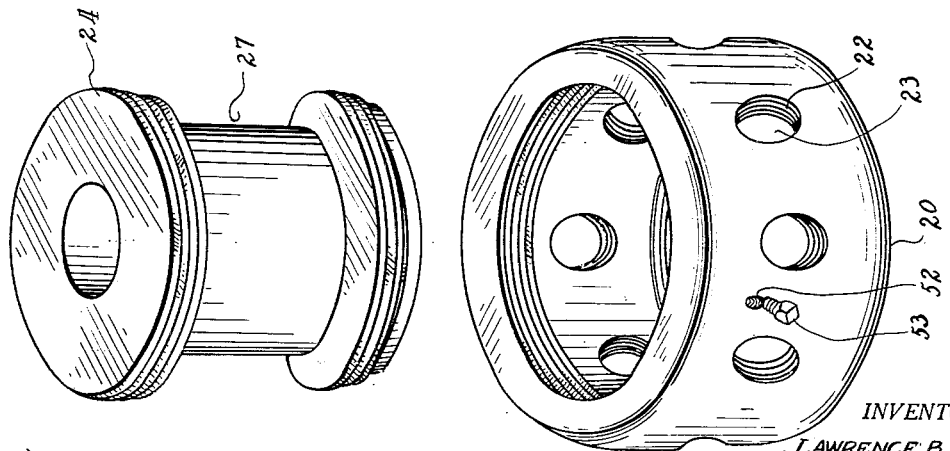

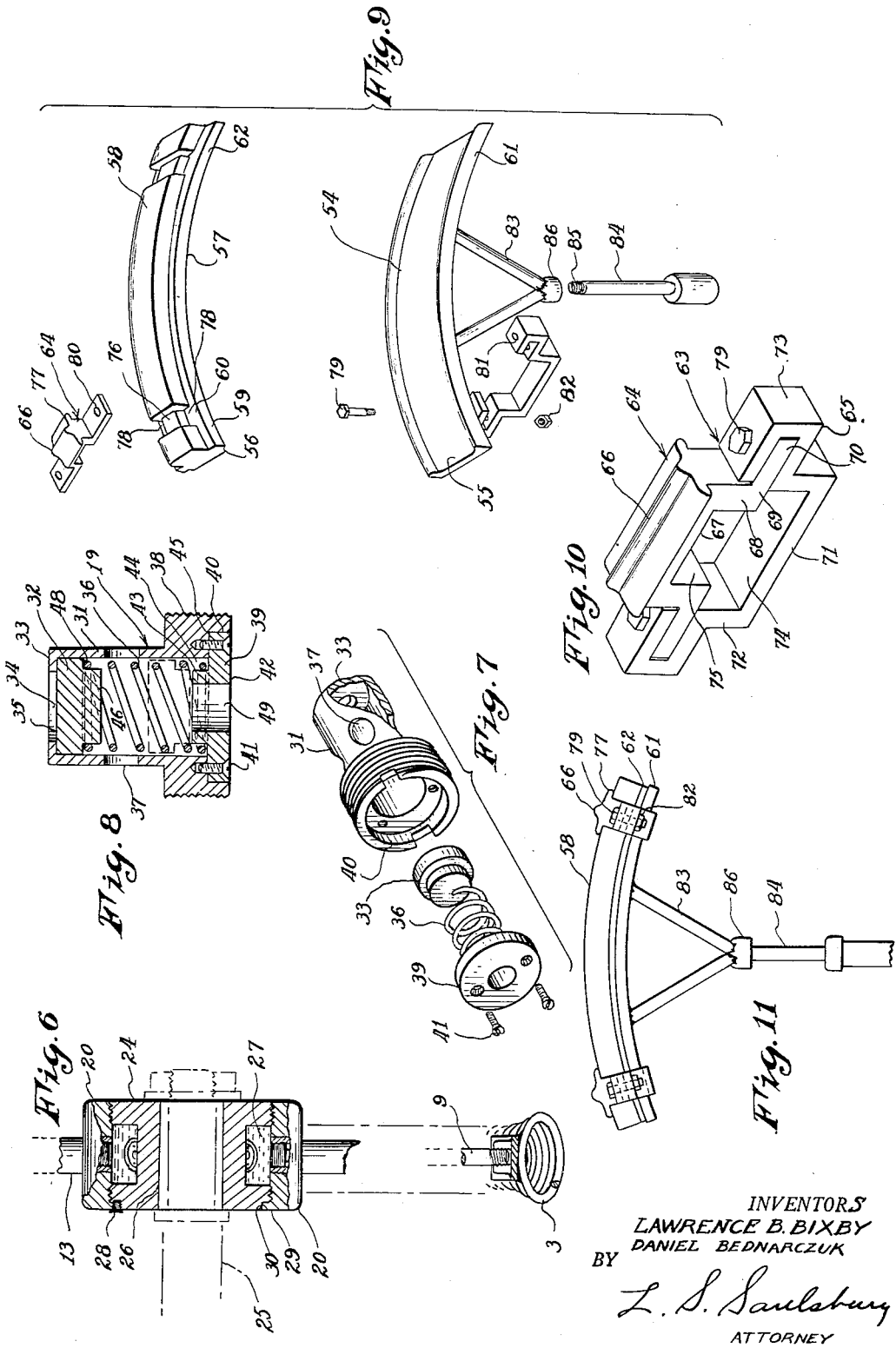

2,715,930

HYDRAULICALLY RESILIENT WHEEL

Lawrence B. Bixby, Fredonia, and Daniel Bednarczuk, Flushing, N. Y.; said Bednarczuk assignor to said Bixby Application November 16, 1951, Serial No. 256,764

6 Claims. (Cl. 152—6)

This invention relates to new and useful improvements in resilient wheels.

It is known in the art to construct a wheel having peripheral portions connected to the hub by spokes which are radially resiliently deformable. Wheels of this type deform when supporting a vehicular load to approximate an ellipse. When in motion each portion of the wheel periphery is progressively pressed radially inward upon contacting the ground, thereby increasing the lineal length of flat tractive surface in ground contact. Since in certain vehicular varieties, wheel traction is of the utmost importance, wheels presenting relatively large tractive surfaces without an accompanied increase in wheel dimensions, decrease in structural safety, riding qualities or an increase in fabricating costs would be most desirable.

The use of springs to create a resilient wheel is objectionable in that defective operation is caused by the inevitable wear of the springs. Since invariably the springs are located internally, proper maintenance can only be had by dismantling the spring containing structure and replacing the defective parts. Moreover, in the conventional organization, no resilient coaction or interplay is had between the several spoke structures to cause a synchronized deformation of the wheel periphery. Such synchronization is desirable since otherwise periphery portions approaching ground contact will impinge upon the ground abruptly rather than smoothly.

In those forms which employ a pneumatic cushion, the hereinbefore described synchronization is likewise not effected. Furthermore, it is doubtful that wheel portions which have been pressed radially inward would assume their original peripheral positions when the deforming force has been removed, solely through the action of the compressed air.

Accordingly then, it is the general object of this invention to provide a wheel of the hereinbefore described species which will present relatively large tractive surfaces progressively wherein all portions of the periphery are caused to deform by the deformation of that peripheral portion in ground contact.

More specifically it is a further inventive object to cause the coaction between all the peripheral portions through fluid means.

Another purpose of this invention relates to the provision of peripheral tractive means which coact with the resilient means of above to further integrate the progressive wheel deformation.

A further object of this invention relates to providing a resilient wheel which has spokes in the form of pistons relatively movable in cylinders which are in fluid communication with a hub located reservoir.

A still further object of this invention relates to providing an additional means for inter-cylinder fluid communications.

A still further object of this invention relates to providing a valve means responsive to piston movement whereby the flow from the cylinders to the reservoir is controlled.

A still further object of this invention relates to providing the cylinders with a normally open check valve which is urged towards the close position by inward piston movement.

A still further object of this invention relates to providing the traction segments with interconnecting resilient means.

A still further object of this invention relates to providing ground contacting wheel segments formed of a torus shaped coiled spring wherein the coils function as traction elements and also as means for resiliently integrating the wheel deformations.

A still further object of this invention relates to providing a traction element with a hard rubber facing which is clamped to rim segments by means which also aid in the tractive effort.

Other objects and advantages will become apparent or suggested from the accompanied description and drawings forming a part of this specification and in which:

Fig. 1 is a side view of a form of the hydraulically resilient wheel;

Fig. 2 is a front view of the wheel in Fig. 1;

Fig. 3 is an exploded perspective view of one of the piston-spoke and cylinder assemblies;

Fig. 4 is an exploded perspective view of the axle and wheel hub assembly;

Fig. 5 is a side view with certain parts in section, of the wheel of Fig. 1 when subjected to a vehicular load;

Fig. 6 is a cross-sectional view taken through line 6—6 of Fig. 5;

Fig. 7 is an exploded perspective view of the cylinder check valve assembly;

Fig. 8 is a longitudinal cross-sectional view of the check valve assembly of Fig. 7;

Fig. 9 is an exploded perspective view of a modified form of wheel periphery segment;

Fig. 10 is a perspective view of the lug and clamp assembly for the modified wheel segment of Fig. 9;

Fig. 11 is a side view of one of the modified wheel segments.

For a more detailed description of the device, refer to the drawings where, in the unloaded wheel embodiment of Fig. 1, it is seen that the structure comprises the peripheral rim segments 2, which are abuttingly encircled by the torus shaped spring 3. Since the outer spring periphery will contact the ground for tractive purposes, the inner spring periphery is adequately secured to the rim periphery by welded means as indicated by the numerals 4. The spring portions adjacent the rim segments 2 are reinforced by the ring segments 5 which are welded thereto externally along opposite coil sides as indicated by the welding 6. As better seen in Fig. 2, the rings 5 are parallel to the rims and their extent approximately that of the rim segments. Consequently, there will be spring portions all along the wheel which are unsupported thereby permitting controlled radial movement of the rim portions relative to one another. The spring coils which are attached to the rim and reinforced by the rings 5, provide efficient resilient traction means. Due to the resilient nature of the above described traction structure, it is apparent that stresses developing in the coils during operation are rapidly distributed to adjoining coils whereby the entire wheel would tend to wear evenly. Moreover, the danger of coil failure due to a concentrated load is greatly diminished. Generally, the spring structure of above provides traction means, and integrates partially the individual radial movements of the rim segments 2.

The various rim segments 2 are connected to the wheel hub assembly 7 by the resilient spoke assembly 8. Referring to Figs. 3 and 5 in particular, it is seen that the spoke assemblies 8 comprise a piston portion 9, screw threaded at 10, so as to be received by the internally threaded nut 11 which in turn is welded at 12 to the rim 2. Receiving the inner end of the spoke 9 is the hydraulic cylinder 13 with an internal bore dimensioned to snugly fit the enlarged piston portion 15 of the spoke 9. The piston portion 15 is provided with a washer 16 at its innermost end and a seal ring 17 fitted into a groove in the piston head, thereby preventing the passage of fluid past the piston head. Internal screw threads, Fig. 3, 18 are formed at the innermost end of cylinder 13 to receive the externally threaded check valve assembly 19 which is shown in detail in Fig. 7. The cylinder 13 is secured to the outer wheel hub 20 by the threaded means 21 on the cylinder 13 and the internal threads 22 formed in the bores 23. The number of spokes, cylinders and bores in the outer wheel hub can be varied to meet any desired condition. Preferably the rim segments, pistons, cylinders, hubs, etc. are formed of suitable metallic materials, the use of other materials can be resorted to within the inventive scope contemplated herein.

The inner wheel hub 24 (better seen in Fig. 6) is generally in the form of a cylinder having the internal bore 26 for the purpose of receiving the axle shaft 25. Formed on the external surface of the inner hub portion is a groove 27 which is enclosed forming a reservoir for fluid by the internal bore of the outer hub portion 20. The outer hub portion 20 is internally threaded to each side of the groove reservoir 27 and the inner hub portion 24 is provided with complementary threaded portions whereby the hub portions can be connected to form a unit. One side of the inner hub portion is recessed as at 30 to form an abutting shoulder for the inwardly projecting annular portion 29 of the outer hub portion. At the interface of the annular portion 29 and the recess 30, the locking screw 28 is provided, thus preventing relative motion between the hub portions.

The check valve 19 which controls communication between the cylinders 13 and the reservoir groove 27, comprises the tubular portion 31, internally bored to snugly receive the valve disc 33. Formed at the outer end of the tubular portion is the transverse annular 33 perforated centrally at 34. The perforation 34 permits fluid pressure to act upon the outer valve disc face 35 and the inner face of the annular 33 acts as a stop means for the valve disc which is urged outwardly by the spring means 36. Providing communication from the cylinder 13 into the tubular portion 31 are the ports 37 which are controlled to some extent by the valve disc 32. The enlarged externally threaded annular member 38 is formed at the inner end of the tubular portion 31 whereby the check valve assembly is secured to the cylinder 13. The spring abutment and valve seat member 39 is received in the enlarged annular recess 40 of the annular member 38 and is attached thereto by the screws 41. Member 39 consists of the disc portion 42 and the valve seat portions 43 which is tubular and of smaller external dimension than the external dimension of the disc portion 42 and the internal dimension of the bore through the tubular portion 31 whereby the spring means 36 is received in the recess 44 acting against the inner face portion 45 of the disc portion 42. The inner end of 43 acts as a valve seating face for the valve disc face 46. To properly align and receive the thrust of the spring means 36, the diameter of the valve disc is reduced to provide the abutment shoulder 48. The combined spring abutment and valve seat member 39 is provided with the bore 49 to cause communication between the check valve interior and the groove reservoir 27.

As an additional means to permit the flow of fluid between the cylinders 13, each cylinder is provided with lateral ports 50 to which are connected the flexible tubes 51.

The fluid contained in the reservoir can be replenished or drained through the hole 52 formed in the outer hub periphery and closed by the plug means 53.

Referring now to Fig. 5, the operation of the device is as follows:

When a wheel portion is in ground contact, those wheel portions which are involved are pressed radially inwardly towards the wheel hub. Consequently, the piston spoke 9 moves toward the check valve 19 thereby increasing the fluid pressure. The resultant pressure differential created between the fluid reservoir in groove 27 and the cylinders involved causes fluid motion from the cylinder involved through the check valve assembly into the groove reservoir and finally into the cylinders in which no relative piston motion has yet occurred; that is those cylinders whose rim portions are not making ground contact and which shall be referred to hereinafter as the free cylinders. The tubing 51 provides an alternate means for permitting inter-cylinder fluid flow in the event that the cause of flow through the check valve becomes stopped up.

The influx of fluid into the free cylinders creates a pressure differential upon the inner piston head whereby the pistons in the free cylinders will be thrust outwardly. In Fig. 5, it is seen that the distance separating the check valve and the piston heads varies progressively from a minimum at the piston whose rim is in ground contact to a maximum at the free piston 180 degrees removed therefrom. Since the effect of the fluid pressure on the pistons would by itself cause an equal outward movement of all the spokes, it is apparent that the progressive variation in spoke movement results from the combined action of the fluid pressure means and the coiled spring member 3. When inward movement of a loaded spoke occurs, each free spoke is subjected to a radially inward thrust generated by the unsupported coils connecting the rim segments. The magnitude of this thrust varies progressively from a maximum at the loaded spoke to a minimum at the free spoke 180 degrees removed therefrom. Consequently, the resulting spoke movement of any spoke will be the vector sum of the two above described movement components.

From the nature of the movement components involved it is apparent that the wheel assembly will undergo an integrated progressive wheel deformation wherein the deformations of a peripheral wheel portion causes a predetermined deformation of the entire periphery.

Although it is apparent that the check valve assembly could be eliminated and still have an operative device, the said valve functions as a retarding or dampening means for the loaded spoke. Referring to Fig. 8, it is seen that inward spoke movement causes fluid to flow through the ports 37 into the valve interior, and then through the seat member bore 49 into the reservoir groove. Since the fluid pressure acting on the outer valve face 35 is much higher than that acting on the inner faces, the valve will be moved towards the seat member. Although there is a slight amount of clearance between the disc periphery and the tubular bore, fluid flow is partially throttled where the valve disc is adjacent the ports 37. The effect of such throttling is to dampen the inward piston movement progressively as opposed to a more sudden inward movement followed by an abrupt halt if there were no valve. Further inward piston movement results in complete fluid flow stoppage when the inner disc face 46 is in seating contact with the sealing face of the valve seat. Obviously a wheel equipped with the tubing 51 would permit further inward spoke motion to an extent predetermined by the tubing dimension.

In summation when a wheel of the above described character is subjected to a vehicular load that wheel periphery portion which is in ground contact or loaded will deform inwardly with a smooth progressively dampened motion, causing the remainder of the wheel periphery to deform progressively so that the load is distributed throughout the wheel structure at all times. Moreover, due to the integrated deformation, the transition from the last preceding ground contacting portion to the peripheral portion about to make contact is accomplished smoothly thereby vastly improving the riding qualities and simultaneously presenting a large flat traction surface.

In the conventional forms, deformation of the loaded peripheral portion causes an abrupt change of curvature between the loaded and unloaded peripheral portions, thereby causing poor riding qualities and greater wear. In the present invention, the curvature changes uniformly, each peripheral portion being adjusted prior to ground contact to blend in with the ground surface thereby diminishing wear.

Another embodiment is depicted in Figs. 9 through 11 wherein 54 is a rim segment grooved as at 55 to receive the complementary protruding annular 56 of the peripheral traction segment 57. The ground contacting portion 58 of the traction segment 57 is offset from the rim contacting portion 59 to provide a ledge 60. When the rim segment 54 and the traction segment 57 are assembled, their radially directed side surfaces 61 and 62 respectively are flush. To assemble the rim and traction segments, there is provided the combined lug and clamp member 63 which comprises the lug member 64 and the clamp member 65. For traction purposes, the lug member is provided with the cleat 66 formed on the exterior portion of the transverse member 67 which joins the two angle shaped portions 68. The outstanding legs 69 and 70 of the angles provide clamping flanges for the clamp member 65. The clamping member comprises the transverse portion 71 joining the parallel radially extending members 72 each connected to the transversely extending U-shaped clamping portions 73. The wheel segment is assembled by firstly mounting the traction segment 57 in the groove 55 and then sliding the clamp member 63 along the rim 54. The rim and traction members 54 and 57 respectively are received in the U-shaped recess 74 extending between the members 72. The lug member 64 is also formed with a U-shaped recess 75 of smaller transverse dimension than the recess 74 which snugly fits about the recessed portion 76 of the traction segment 58. The ledge 60 provides an abutment wall for the inner face of the angle legs 69 and 70. The recess 76 is so proportioned that the flange portions 77 of the cleat 66 bear on the traction surface of 58 and the radially extending legs of the angles 68 fit snugly in the complementary cut out slots 78 of the recessed portion 76. With the lug member 64 properly positioned in the recess 76, the clamp member 63 is slid along the rim until the legs 69 and 70 are received in the clamping portions 73. To cause a clamping force the bolts 79 are provided which are received by the holes 80 in the lug member and the holes 81 in the clamp member and which coact with the nuts 82.

The rims 54 are provided with spoke struts 83 relatively inclined in the form of a V. The spoke piston 84 is attached to the struts 83 at their intersection by the screw threaded means 85 and 86. The remaining cylinder and hub structure is similar to that previously described and depicted in Fig. 5.

It is apparent that the instant wheel segment modification provides an efficient easily assembled and fabricated structure wherein the clamping means function dually as a clamping means and as a traction cleat. When in combination with the hereinbefore described hydraulically controlled deformation means, the resulting operation is commensurate with the stated inventive objects. Although there is no circumferential linkage between the wheel segments, the hydraulically controlled deformation insures the proper load distribution.

It should be understood that since a plurality of modifications have been disclosed herein, other modifications obtainable by combining elements of the different forms or resulting from various changes in shape, size and material are contemplated herein and may be resorted to within the inventive scope.

What is claimed is:

1. A resilient wheel comprising a hub portion, said hub portion including a reservoir for a fluid medium, spoke cylinders extending radially from the hub portion, said spoke cylinders being in fluid communication with the reservoir, pistons slidably retained in each of said spoke cylinders, each of said pistons having an outwardly extending rod, individual peripheral rim segments respectively connected to each of said rods, a torus-shaped tread spring connected to and surroundingly supported by the rim segments, fluid flow control means in each of said spoke cylinders responsive to piston displacement in each cylinder to throttle fluid flow between cylinders and reservoir, and auxiliary fluid flow means to augment fluid flow between cylinders whereby upon radial inward piston displacement of any piston results in a radial outward movement of all the other pistons.

2. A resilient wheel comprising a hub portion, said hub including a reservoir for a fluid medium, cylinders extending radially from the hub portion, said cylinders being all in fluid communication with the reservoir, pistons slidably retained in each of said spoke cylinders, each of said pistons having an outwardly extending rod, individual peripheral rim segments respectively connected to each of said rods, a torus-shaped traction spring encircling said rim segments, said spring having lateral reinforcing rigid ring segments of substantially the same extent as the rim segments, providing the traction spring with free resiliency between rim and ring segments, fluid flow control means in each of said spoke cylinders responsive to piston displacement in each cylinder to throttle fluid flow between cylinders and reservoir, and auxiliary fluid flow means to agument inter-cylinder fluid flow whereby upon radial inward piston displacement of any piston results in a radial outward displacement of other pistons.

3. A resilient wheel, as in claim 1, wherein the fluid flow control means in each cylinder is a normally open check valve.

4. A resilient wheel, as in claim 3, wherein each of the check valves comprise a tubular element removably attached to the inner end of each cylinder, said element having lateral ports, an outer transverse wall with a central bore communicating with the cylinder bore, a valve disc spring biased against said wall and a valve seat member intermediate the ports and the inner end of the tubular element whereby fluid pressure acting on the outer valve disc face will force the valve disc into valve closing position upon inward piston movement.

5. A resilient wheel, as in claim 1, wherein the hub portion comprises an inner member adapted to receive an axle shaft, an outer member cylindrical member enclosing the inner member and threadedly attached thereto, said inner member being cylindrical with an external peripheral groove forming thereby a reservoir space intermediate the inner and outer members, said outer member having the cylinders threadedly attached thereto, and means for draining and replenishing the fluid supply in the reservoir.

6. A resilient wheel comprising a hub portion, said hub portion including a reservoir for a fluid medium, spoke cylinders extending radially from the hub portion, said spoke cylinders being in fluid communication with the reservoir, pistons slidably retained in each of said spoke cylinders, each of said pistons having an outwardly extending rod, individual peripheral rim segments respectively connected to each of said rods, resilient traction tread means connecting and surroundingly supported by the ring segments, fluid flow control means in each of said spoke cylinders responsive to piston displacement in the cylinder to throttle fluid flow between cylinder and reservoir, and auxiliary fluid flow means to augment fluid flow between cylinders whereby upon radial inward displacement of any one piston, all the other pistons are outwardly displaced.

References Cited in the file of this patent

UNITED STATES PATENTS

| | | |
|---|---|---|
| 895,554 | Graff | Aug. 11, 1908 |
| 997,302 | Langford | July 11, 1911 |
| 1,000,472 | Williams | Aug. 15, 1911 |
| 1,034,975 | Butts | Aug. 6, 1912 |
| 1,266,654 | Beale | May 21, 1918 |
| 2,071,969 | Diescher | Feb. 23, 1937 |

FOREIGN PATENTS

| | | |
|---|---|---|
| 135,645 | Great Britain | 1919 |
| 196,056 | Canada | Jan. 13, 1920 |